4 Sheets—Sheet 1.

J. H. TROUTMAN & W. H. H. GREEN.
Cooking-Stoves.

No. 196,271. Patented Oct. 16, 1877.

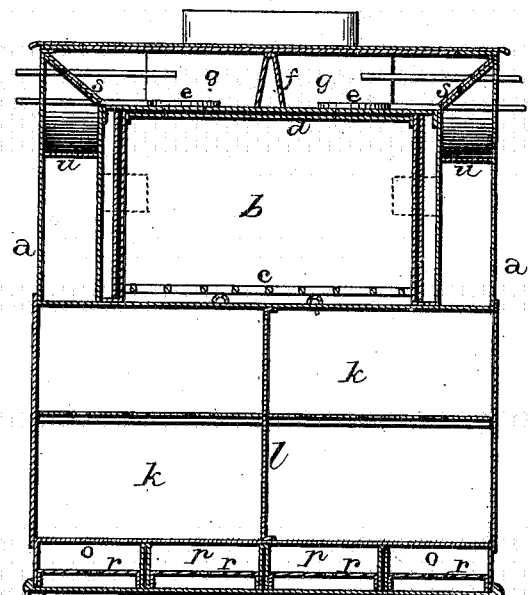
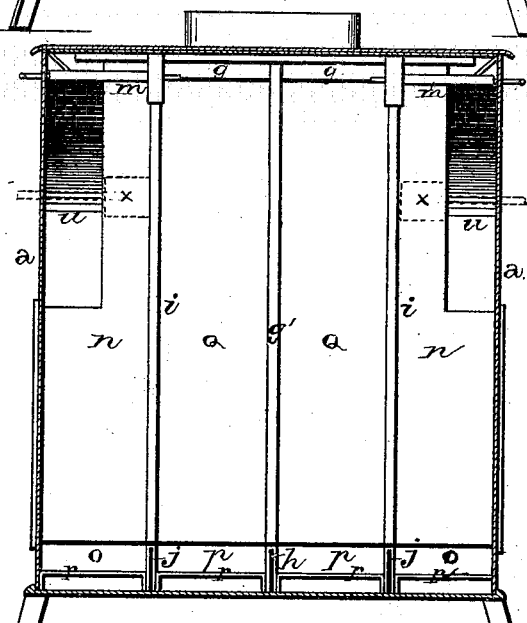

4 Sheets—Sheet 3.
J. H. TROUTMAN & W. H. H. GREEN.
Cooking-Stoves.
No. 196,271. Patented Oct. 16, 1877.
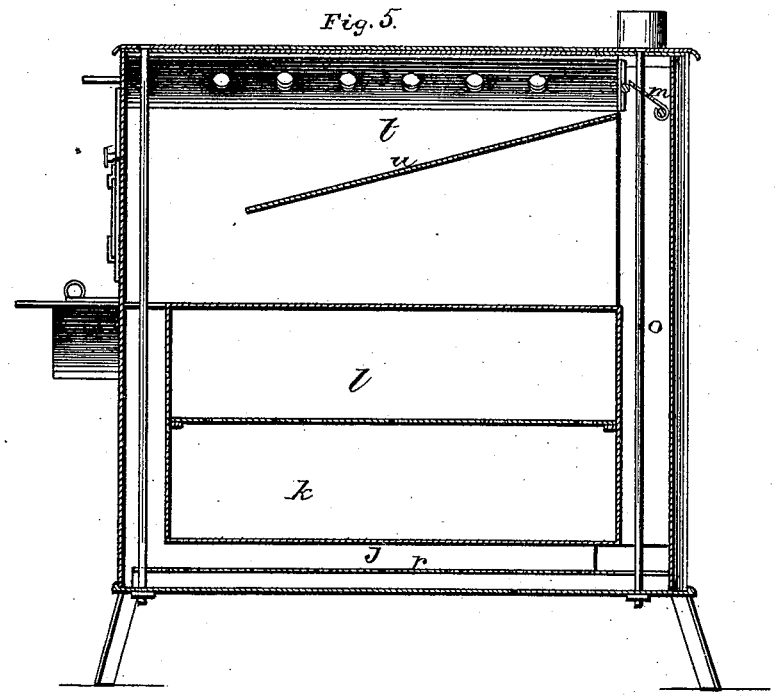
WITNESSES.
INVENTORS.

4 Sheets—Sheet 4.

J. H. TROUTMAN & W. H. H. GREEN.
Cooking-Stoves.

No. 196,271. Patented Oct. 16, 1877.

UNITED STATES PATENT OFFICE.

JOHN H. TROUTMAN AND WILLIAM H. H. GREEN, OF AUBREY TOWNSHIP, JOHNSON COUNTY, KANSAS, ASSIGNORS TO GREEN, TROUTMAN & CO.

IMPROVEMENT IN COOKING-STOVES.

Specification forming part of Letters Patent No. 196,271, dated October 16, 1877; application filed August 9, 1877.

*To all whom it may concern:*

Be it known that we, JNO. H. TROUTMAN and WM. H. H. GREEN, of Aubrey township, in the county of Johnson and State of Kansas, have invented certain new and useful Improvements in Cooking-Stoves; and we do hereby declare the following to be a full, clear, and exact description of the invention, such as will enable others skilled in the art to which it pertains to make and use it, reference being had to the accompanying drawings, which form part of this specification.

Our invention relates to an improvement in cooking-stoves, and is intended as an improvement upon the patent granted to W. W. Karshner August 5, 1873, No. 141,508; and it consists in dividing the stove by means of suitable partitions into two parts, thus enabling either the whole of the stove or either half of it to be used in cooking.

Our invention further consists in the arrangement and combination of devices that will be more fully described hereinafter, whereby a great economy of fuel is obtained.

Figure 1:
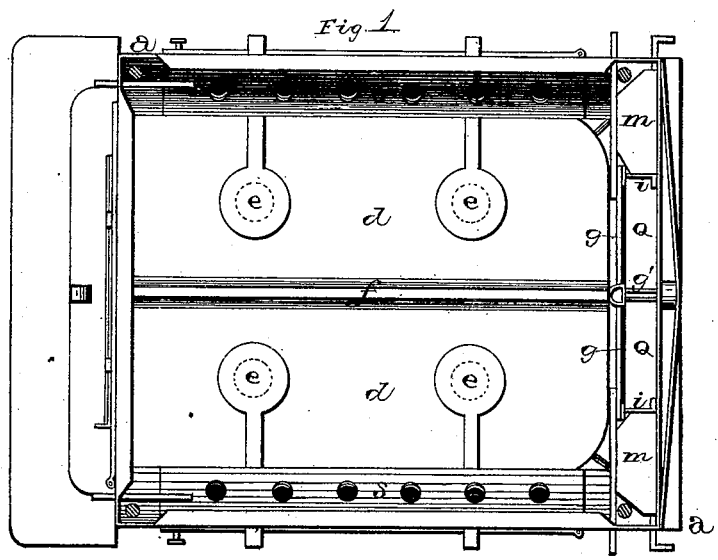
Figure 2:
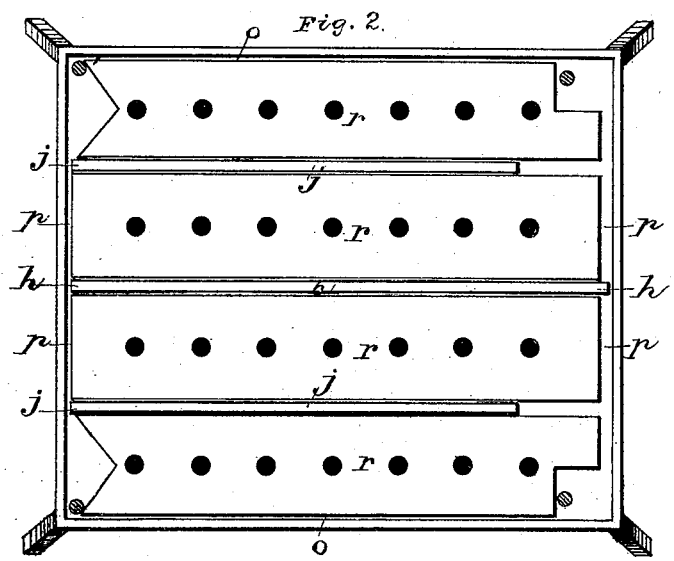
Figure 6:
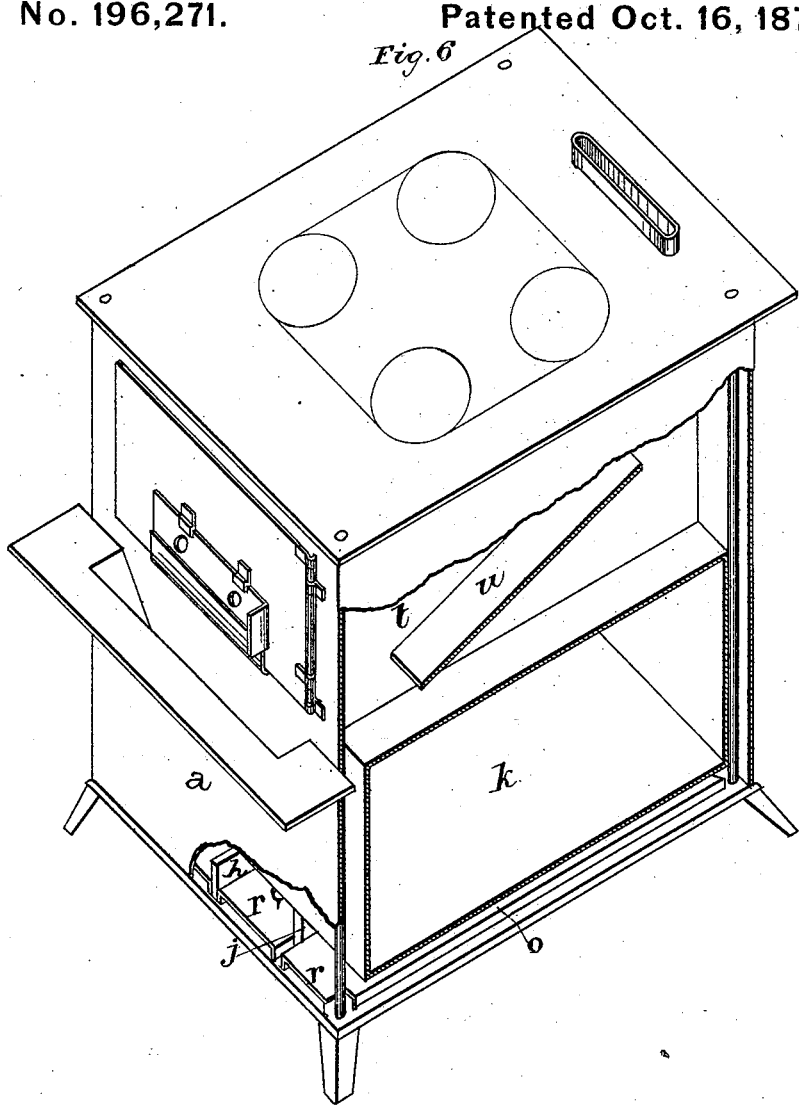

Figure 1 is a plan view of our stove, with the cover removed. Fig. 2 is a horizontal section, taken above the plates $r$. Fig. 3 is a vertical cross-section of our invention. Fig. 4 is a rear view of the stove, with back plate removed, showing the vertical flues; Fig. 5, a side elevation of the stove, with side plate removed. Fig. 6 is a perspective of the stove, parts being broken away.

$a$ represents the frame of a cooking-stove, that is constructed in the ordinary manner. $b$ is the fire-chamber, and $c$ the fire-grate.

In constructing this fire-chamber the sides are formed of two iron plates, which have a layer of fire-clay or other suitable substance placed between them, and they are then bolted rigidly together, and so fitted as to make the fire-chamber as nearly air-tight as possible. The top $d$ of this fire-chamber is also made in the same way; and this top, the sides, and the bottom of the chamber are all made removable, so that they can be removed in case of injury or when they are worn out, and replaced by new pieces. Through the top plate $d$ are made a number of openings for the escape of the heat from the fire-chamber, which are controlled by the valves $e$. Upon the top of this plate $d$ is formed the division-plate $f$, which divides the top flue into two equal divisions, so that the heat from the fire-chamber can be thrown wholly into either division that may be preferred. At the rear end of the top flue are the two dampers $g$ $g$, which close the entrances on each side of the division-plate $f$ to the pipe when it is not desired to allow the products of combustion to pass directly up the chimney. The dampers $m$, of ordinary construction, control the downward passage of the products of combustion through the flues $n$.

Extending downward between the rear side of the oven and the rear side of the stove is a similar division-plate, $g'$, which divides the space between the rear of the oven and the rear of the stove into two equal divisions, the same as on top in the top flues. The chamber formed by the bottom of the oven and the bottom of the stove is also divided by a similar division-plate, $h$, into two equal divisions, the division-plate running the entire length of the stove.

Thus it will be seen that the three division-plates $f$ $g'$ $h$ divide all that part of the stove through which the heat passes into two equal divisions, into either one of which the whole heat of the fire can be thrown by means of the valves $e$, to the entire exclusion of the other.

Upon each side of the division-plates or partitions $g$ $h$ is placed another partition, $i$ $j$, thereby dividing the passage down the back of the stove and the chamber under the oven into four flues, the two partitions $j$ being made shorter than the central one $h$, so that the two flues shall connect at the front end of the stove. The oven $k$ is also divided vertically into two equal divisions by means of the partition $l$, and each division is provided with its own shelves, so that cooking can be done in either side alone without having to make such a large fire as to heat the whole oven. When the dampers $g$ are closed and the dampers $m$ are opened, the products of combustion pass down through the vertical flues $n$, along forward under the oven, through the flues $o$, back through the central flues $p$, and up the vertical flues $q$ to the pipe.

In all four of the horizontal flues under the oven are placed the perforated flanged plates $r$, the flanges serving to raise the plates a suitable distance above the floor. These plates are removable at pleasure, and serve to protect the bottom of the stove from excessive heat. The perforations in the plates allow the soot to be deposited over the floor in such a manner that the bottom of the stove can never be burnt out, no matter how great the heat may be. In each of the top flues are placed the winter-dampers $s$, which control the passage of the products of combustion down through the flues $t$ in the side of the stove, above the oven-doors. Just under the openings $v$, which these dampers $s$ control, is placed the incline $u$, which conducts the products of combustion toward the front end of the stove, down to the front ends of the two horizontal flues $o\ p$, and thence pass up the chimney. These two dampers are opened when it is desired to use the stove for heating as well as cooking purposes, and may be used alone or in connection with the dampers $m$.

Through the rear side of the fire-chamber, opening into the flues $q$, are two holes, which are controlled by the dampers $x$, as shown in Fig. 4. When it is desired to turn the products of combustion down the flues under the oven, the dampers $e$ are closed and the dampers $x$ opened, when the heat passes directly down into the flues, so that the oven may get the benefit of it all without any loss by radiation through the top. Two dampers are made, so that there may be one for both divisions of the stove. The perforated plates $r$ may also be placed inside of the vertical flues, for the purpose of protecting the rear side of the stove.

Having thus described our invention, we claim—

1. In a cooking-stove, the combination of the flanges or partitions $f\ g'\ h\ i\ j$, dampers $g\ m$, and flues $n\ o\ p\ q$, substantially as specified.

2. In a cooking-stove, the combination of the dampers $s$, located in the top flues of the stove, with the flues $t$, down the side of the stove, over the oven-door, and the flues $p\ q$, substantially as described.

3. In a cooking-stove, the combination of the dampers $m$, at the rear of the stove, and the flues $n\ o\ p\ q$ with the side dampers $s$ and flues $t$, either set of dampers being adapted to be used alone, substantially as specified.

In testimony that we claim the foregoing we have hereunto set our hands this 28th day of July, 1877.

JOHN H. TROUTMAN.
WM. H. H. GREEN.

Witnesses:
E. P. SHORT,
JAMES HUNTER.